United States Patent
Eskildsen

(10) Patent No.: US 7,642,910 B2
(45) Date of Patent: Jan. 5, 2010

(54) MULTI-FREQUENCY ALARM SYSTEM RECEIVER WITH INTERFERENCE DETECTION

(75) Inventor: Kenneth G Eskildsen, Great Neck, NY (US)

(73) Assignee: Honeywell International Inc., Morristown, NJ (US)

( * ) Notice: Subject to any disclaimer, the term of this patent is extended or adjusted under 35 U.S.C. 154(b) by 581 days.

(21) Appl. No.: 11/478,156

(22) Filed: Jun. 29, 2006

(65) Prior Publication Data

US 2008/0001731 A1    Jan. 3, 2008

(51) Int. Cl.
*G08B 1/08* (2006.01)

(52) U.S. Cl. ............... 340/539.1; 340/541; 340/506; 455/63.1; 375/259

(58) Field of Classification Search ........... 340/539.1, 340/541, 506, 5.64, 5.6, 5.71, 539.22, 870; 455/63.1, 135, 151.1, 161, 164.2; 370/310; 375/211

See application file for complete search history.

(56) References Cited

U.S. PATENT DOCUMENTS

| | | | |
|---|---|---|---|
| 3,757,315 A * | 9/1973 | Birchfield et al. | 340/539.16 |
| 5,222,106 A * | 6/1993 | Satoh et al. | 375/349 |
| 2002/0094034 A1 * | 7/2002 | Moriyama | 375/271 |
| 2002/0176521 A1 * | 11/2002 | Kirke et al. | 375/335 |
| 2003/0007547 A1 * | 1/2003 | Huo | 375/132 |
| 2003/0040279 A1 * | 2/2003 | Ballweg | 455/66 |
| 2003/0043937 A1 * | 3/2003 | Kobayashi et al. | 375/340 |
| 2004/0142690 A1 * | 7/2004 | Eom et al. | 455/436 |
| 2005/0246092 A1 * | 11/2005 | Moscatiello | 701/207 |
| 2005/0270173 A1 * | 12/2005 | Boaz | 340/870.02 |
| 2005/0275527 A1 * | 12/2005 | Kates | 340/539.22 |
| 2006/0109078 A1 | 5/2006 | Keller et al. | |
| 2006/0109079 A1 | 5/2006 | Mack | |
| 2008/0316021 A1 * | 12/2008 | Manz et al. | 340/539.13 |

* cited by examiner

*Primary Examiner*—Davetta W Goins
*Assistant Examiner*—Hoi C Lau
(74) *Attorney, Agent, or Firm*—Barkume & Associates, P.C.

(57) ABSTRACT

An alarm system receiver that is capable of receiving signals transmitted from wireless intrusion detectors at more than one frequency and automatically switching from receiving at one frequency to receiving at a different frequency based on the detection of an interference signal. The alarm system receiver senses a first signal, filters the sensed first signal at a first frequency, demodulates the filtered first signal at the first frequency, and determines if a first interference signal is present in the demodulated first signal for a predetermined time. If the first interference signal is not present in the demodulated first signal, it processes the demodulated first signal as an alarm system signal. If the first interference signal is present in the demodulated signal, the alarm system receiver senses a second signal, filters the sensed second signal at a second frequency, demodulates the filtered second signal at the second frequency, and processes the demodulated second signal as an alarm signal. The alarm system receiver consists of an antenna, more than one filter, more than one local oscillator for providing oscillator signals at the predetermined frequencies, a demodulator for inputting one of the oscillator signals and a corresponding one of the filtered signals to provide a demodulated signal, and an interference detection circuit for inputting the demodulated signal, determining if an interference signal is present in the demodulated signal, and providing an interference detection signal.

10 Claims, 2 Drawing Sheets

MULTI-FREQUENCY ALARM SYSTEM RECEIVER WITH INTERFERENCE DETECTION

CROSS-REFERENCE TO RELATED APPLICATION

This application is related to co-pending application Ser. No. 11/281,199; filed Nov. 16, 2005; MULTI-FREQUENCY WIRELESS TRANSMITTER, assigned to the same assignee as the present application.

TECHNICAL FIELD

This invention relates to security systems, and in particular to an alarm system receiver that automatically switches to a different frequency band when an interference signal is detected.

BACKGROUND ART

Security systems use many detection devices for monitoring an area. These devices include motion detectors, window contacts, glass break detectors, video cameras, temperature sensors, smoke detectors, etc. These devices send signals to an alarm panel, which accepts the signals, processes them, and generates alarm messages to a central alarm station if necessary. The detectors may be hardwired to the alarm panel or may contain an RF transmitter that sends the signal wirelessly to the alarm panel. Detectors with wireless transmitters are commonly used because of their installation ease. These wireless detectors use RF transmitters in the 260 MHz to 470 MHz range and send the signals to the alarm panel multiple times to ensure receipt of the signal. In the United States, the transmitted signals are governed by FCC regulations as explained below. Governmental agencies in other countries may also have similar regulations.

Wireless transmitters for security systems may be one of two basic types, single frequency and frequency hopping. The single frequency transmitters send all of the alarm signals to the alarm panel using a selected carrier frequency. The receiver in the alarm panel decodes only signals at the selected frequency of the carrier signal. The single frequency transmitters are regulated by Part 15 of the FCC regulations, which requires a signal to be less than [41.66 ($\mu$V/m)/MHz] *F-7083.33 $\mu$V/m, where F is the frequency of the transmitted signal. It also requires that a signal be present for less than 5 seconds.

The frequency hopping transmitters transmit signals over fifty different frequency channels. The transmitters use an algorithm to determine the frequency at which each alarm signal will be transmitted. The receiver in the alarm panel senses signals over a wide frequency range and also has a corresponding algorithm to determine which frequency band to locate the alarm signal. The electronics for both the transmitter and the receiver are much more complex and costly than the single frequency systems. In addition the frequency hopping transmitters are regulated by part 15.247 of the FCC regulation which requires the signal to be less than 50 mV/m.

The single frequency systems have a number of benefits such as a more robust transmitted signal, less complex hardware, and lower cost, however, can be susceptible to in-band interference. Interference occurs when, for example, a signal is radiated by an unintentional radiator in the vicinity of the alarm system receiver in the same frequency band as the alarm system receiver.

The frequency hopping system transmits at many frequencies and is less susceptible to in band interference because, even though part of the alarm signal may be transmitted at the frequency of the interference signal, it will transmit the signal again at a different frequency. If the receiver is tuned to the same frequency as the interference signal at first, it will receive only the interference data, but once it is tuned to a different frequency (or frequencies) it will be able to decipher the transmitted alarm signal. It is desirable to create a system that has the benefits of a frequency hopping system with the cost and simplicity of a single frequency system.

It is therefore an object of the present invention to provide an alarm system receiver that is capable of receiving alarm signals from a detection device when an interference transient is present.

It is a further object of the present invention to provide an alarm system receiver that is capable of sensing signals at more than one frequency.

It is a further object of the present invention to be able to detect an interference transient at one frequency and automatically switch to receiving signals at a different frequency.

It is a further object of the present invention to provide an alarm system receiver that is less complex and costly than a frequency hopping system receiver.

DISCLOSURE OF THE INVENTION

The present invention is an alarm system receiver that is capable of receiving signals transmitted from wireless intrusion detectors at more than one frequency and automatically switch from receiving at one frequency to receiving at a different frequency based on the detection of an interference signal.

The wireless intrusion detectors transmit an alarm signal multiple times (typically 12 with a one second pause after the sixth time) alternating the frequency carrier each time.

The alarm system receiver receives the signals in the following manner. It senses the first signal, filters the sensed first signal at a first frequency, demodulates the filtered first signal at the first frequency, and determines if a first interference signal is present in the demodulated first signal for a predetermined time. If the first interference signal is not present in the demodulated first signal, it processes the demodulated first signal as an alarm system signal. If the first interference signal is present in the demodulated signal, the alarm system receiver senses a second signal, filters the sensed second signal at a second frequency, demodulates the filtered second signal at the second frequency, and processes the demodulated second signal as an alarm signal.

The alarm system receiver may also determine if a second interference signal is present in the demodulated second signal for a predetermined time. If the second interference signal is present in the demodulated second signal then the alarm system receiver does not process the demodulated second signal as an alarm signal. Instead, the alarm system receiver senses a subsequent signal and filters the sensed subsequent signal at a subsequent frequency. The subsequent frequency may simply be the same as the first frequency or may be a third different frequency. The alarm system receiver then demodulates the filtered subsequent signal at the subsequent frequency, and determines if a subsequent interference signal is present in the demodulated subsequent signal for a predetermined time. If the subsequent interference signal is not present in the demodulated subsequent signal, the alarm system receiver processes the demodulated subsequent signal as an alarm system signal, and if the subsequent interference signal is present in the demodulated subsequent signal, the alarm system receiver repeats the process again with a different frequency. If all frequencies are experiencing interference, a signal is sent to the central monitoring station stating that there is an RF interference.

The alarm system receiver consists of an antenna for sensing signals and more than one filter for filtering the sensed signals at predetermined frequencies. In the preferred embodiment there are two filter circuits and when interference has been detected in a signal from one filter the signal from the other filter is used. The preferred embodiment filters are at 345 MHZ and 315 MHZ. In alternative embodiments the number of filters and the frequencies of the filters correspond to the transmitted frequencies from the intrusion detector devices which may transmit signals in the frequency range between 260 MHz and 470 MHz, for FCC part 15 operation. The alarm system receiver also includes more than one local oscillator for providing oscillator signals at the predetermined frequencies, a demodulator for inputting one of the oscillator signals and a corresponding one of the filtered signals to provide a demodulated signal, and an interference detection circuit for inputting the demodulated signal, determining if an interference signal is present in the demodulated signal, and providing an interference detection signal.

The alarm system interference detection circuit determines that an interference signal is present when the interference signal is greater than [41.66 ($\mu$V/m)/MHz]*F-7083.33 $\mu$V/m, where F is the frequency, for more than two seconds. This threshold level and time is based on the FCC regulations, wherein any signal stronger than this level for two seconds could not be generated by an alarm system detection device transmitter. Once the presence of interference has been detected, an interference detection signal from the interference detection circuit may be used for selecting a different oscillator signal and corresponding filtered signal for demodulating. The alarm system receiver also comprises a slicer circuit for quantizing the demodulated signal and a microcomputer for decoding the quantized demodulated signal, processing it as an alarm signal, and providing an alarm message to the alarm panel for transmission to an alarm station. The interference detection signal may also be further processed by the microcomputer to provide frequency selection signals which are input into analog switches that are used to select one of the oscillator signals and one of the filtered signals to be inputted into the demodulator. The microcomputer will send an interference message to the alarm panel when the alarm system receiver has determined that an interference signal is present.

BEST MODE FOR CARRYING OUT THE INVENTION

Figure 1:
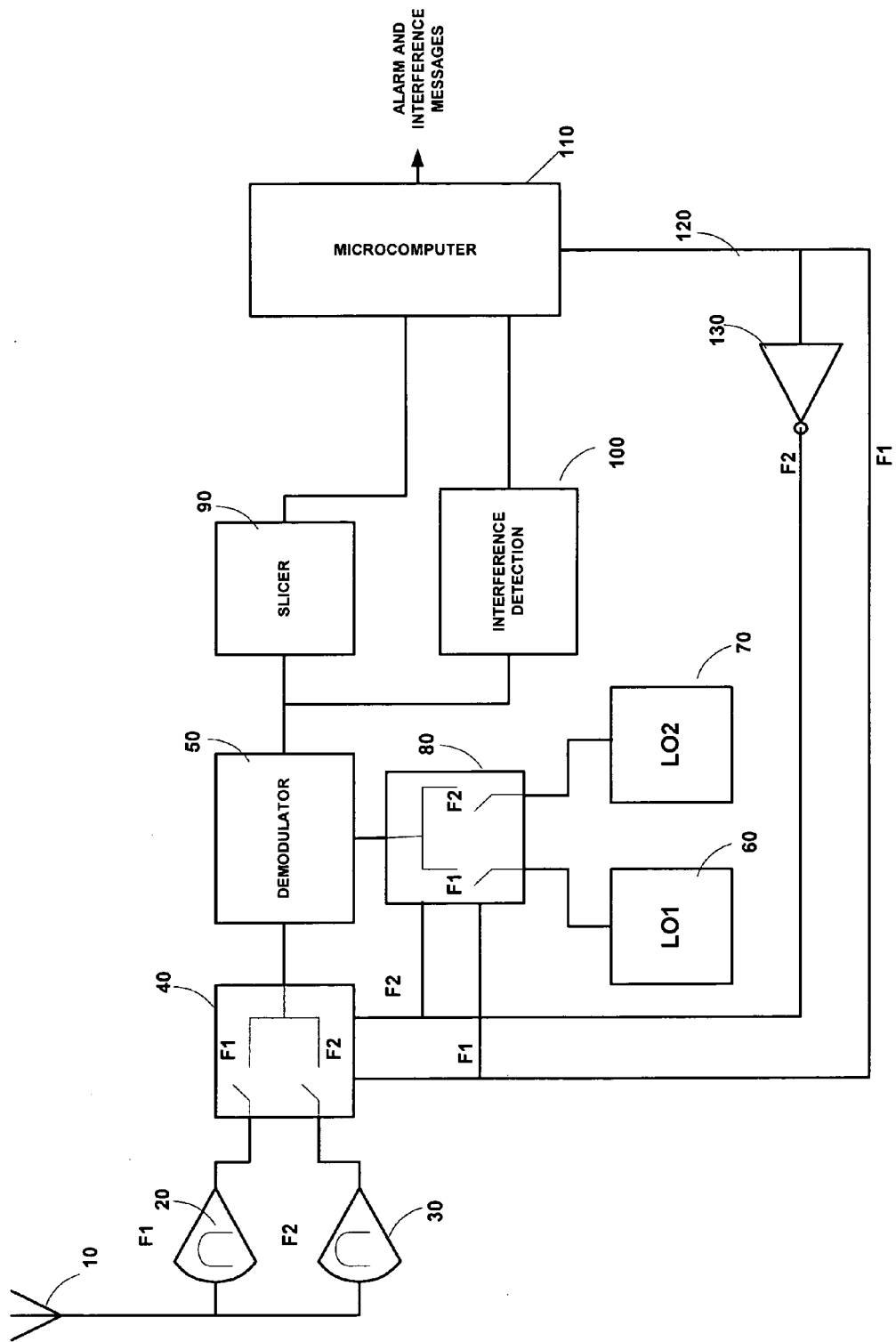
FIG. 1 is a block diagram of the present invention.

The preferred embodiments of the present invention will now be described with respect to the Figures. FIG. 1 illustrates a block diagram of the alarm system receiver 5 that has the ability to receive alarm signals at two frequencies. The alarm signals are received by antenna 10 and filtered by filters F1 20 and F2 30. F1 20 is a bandpass filter with center frequency 345 MHz and F2 30 is a bandpass filter with center frequency 315 MHz. Analog switches 40 are used to select which filter's signal is demodulated. The demodulator circuit 50, which is well known in the art, inputs the selected filter's signal and a local oscillator signal LO1 60 or LO2 70. The local oscillator signal LO1 60 or LO2 70 is selected by analog switches 80. The frequency of the local oscillator selected is offset to the carrier frequency of the filter selected; the offset amount is equal to the IF frequency. The demodulator 50 strips the carrier frequency from the filtered signal and provides a demodulated signal to the slicer 90 and the interference detection circuit 100. The slicer 90 quantizes the demodulated signal, as known in the art, and provides a digital signal that contains the alarm signal information from an intrusion detector device to the microcomputer 110. The interference detection circuit 100, also well known in the art, is a comparator circuit that determines if the demodulated signal is greater than [41.66 ($\mu$V/m)/MHz]*F-7083.33 $\mu$V/m, where F is the frequency, for more than two seconds. The signal level and duration is selected due to the intrusion detector not being able to transmit a signal that is greater than [41.66 ($\mu$V/m)/MHz]*F-7083.33 $\mu$V/m for more than two seconds under FCC regulations. Therefore any signal greater than [41.66 ($\mu$V/m)/MHz]*F-7083.33 $\mu$V/m for more than two seconds is determined to be an interference signal. The interference detection circuit 100 provides a logic signal to the microcomputer 110 that alerts the microcomputer 110 when the digital signal from slicer 90 has been interfered with and is therefore meaningless. If the interference detection circuit 100 determines there is no interference signal present, the microcomputer 110 processes the signal from the slicer 90 as a normal alarm signal, as well known in the art, and transmits an alarm message to the alarm panel. If the interference detection circuit 100 determines there is an interference signal present, the microcomputer 110 changes frequency select signal 120 so that a different filter 20 or 30 and a different local oscillator 60 or 70 is selected by signal 120 and the output of inverter 130, which inverts signal 120 so that only one filter and local oscillator are selected. The microcomputer 110 also transmits an interference message to the alarm panel.

Figure 2:
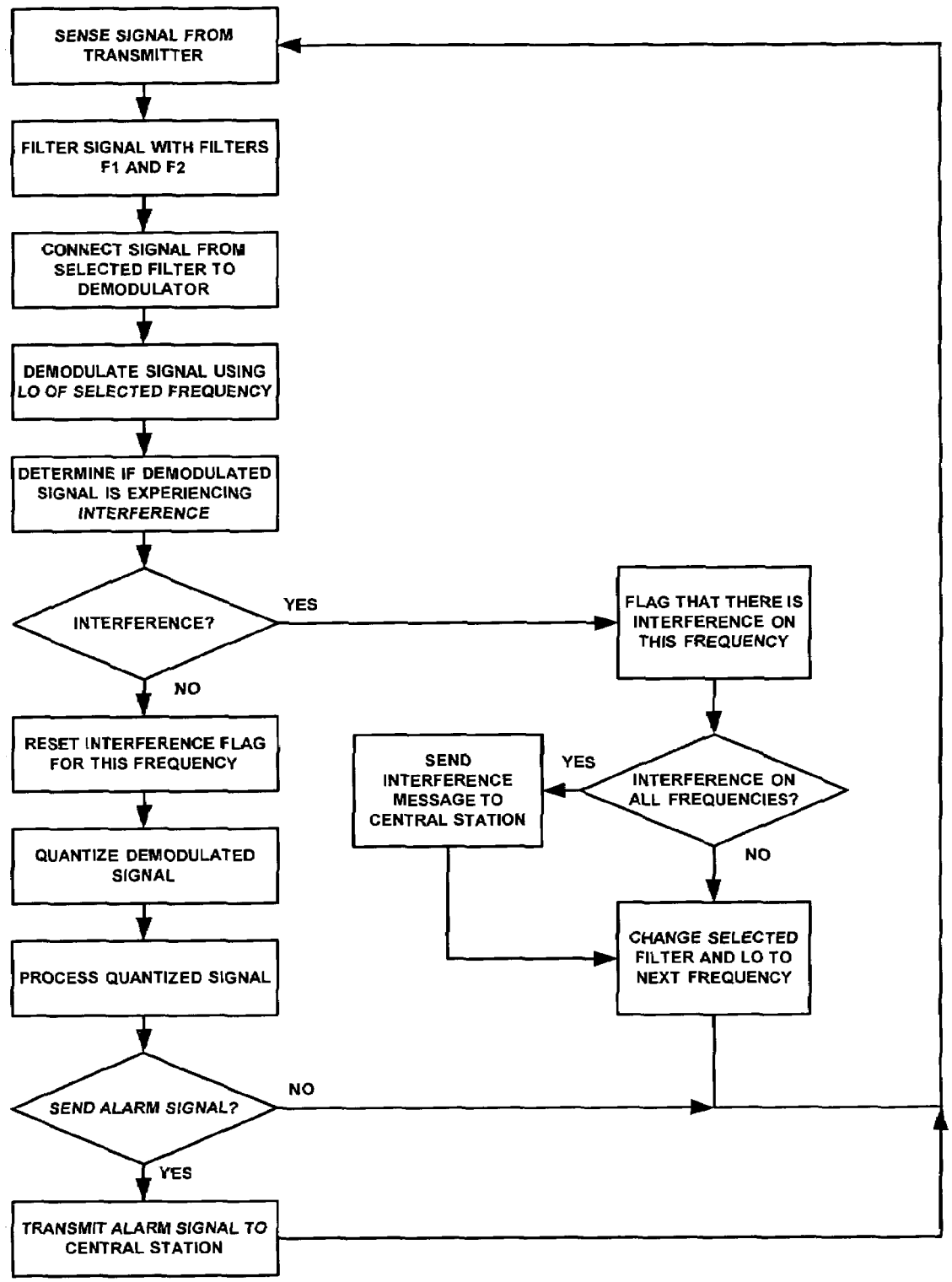
FIG. 2 is a flowchart of the present invention.

FIG. 2 is a flow diagram of the present invention. The alarm system receiver 5 senses a signal from a transmitter. This signal may be transmitted from an intrusion detection device or an interference source. The sensed signal is filtered with filters F1 20 and F2 30. The resulting signals should contain only signals from the intrusion detection device, but there may be a rare occasion when the interference signal is at the same frequency as the center frequency of one of the filters. At this point the microcomputer selects one of the signals from the filters to be connected to the demodulated circuit 50 which uses a local oscillator with a frequency that corresponds to the selected filter. The interference detection circuit 100 determines if the resulting demodulated signal is the result of an interference signal. If it is not, the microcomputer 110 reads the quantized signal from the slicer 90, processes it, and determines if an alarm message should be transmitted to the alarm panel. If there is an interference signal, the microcomputer changes the selected filter and, if all filters are experiencing interference, sends an interference message to the alarm panel. In either case the alarm system receiver 5 continues to sense signals from the transmitters and filter them. When an interference signal has been detected the selected filter for the next sensed signal is different, where as when no interference signal has been detected the selected filter for the next sensed signal is the same.

One skilled in the art will recognize that the preferred embodiment may be expanded to include multiple filters and local oscillators with the microcomputer 110 controlling the selection of the filters and local oscillators with a bus. The number of filters added would be small in order to keep the simplicity of the receiver. In addition, an analog-to-digital converter can be added after the demodulator circuit 50 to convert the demodulated signal to a digital signal which is read by the microcomputer 110. The microcomputer 110 can then perform the functions of the slicer 90 and the interference detection circuit 100 thereby eliminating the need for these circuits. The microcomputer 110 can also perform additional operations that are dependent on the selected filter frequency. For instance, the threshold of the interference detection circuit 100 comparator may be a set threshold at a chosen frequency, or may be an adjustable threshold chosen by the microcomputer 110 based on the selected filter. The microcomputer 110 may also upon receiving an interference signal wait a period of time before selecting a different filter to see if the interference source goes away.

What is claimed is:

1. An alarm system receiver comprising:
   a. an antenna for sensing signals,
   b. a first filter for filtering said sensed signals at a first frequency to provide a first filtered signal and a second filter for filtering said sensed signals at a second frequency to provide a second filtered signal;
   c. a first local oscillator for providing first oscillator signals at said first frequency and a second local oscillator for providing second oscillator signals at said second frequency;
   d. a demodulator for inputting one of said first or second oscillator signals and a corresponding one of said first or second filtered signals to provide a demodulated signal;
   e. an interference detection circuit for determining if an interference signal is present in said demodulated signal and for providing an interference detection signal;
   f. a slicer circuit for generating a quantized demodulated signal from said demodulated signal,
   g. a microcomputer for processing said quantized demodulated signal as an alarm signal and for processing said interference detection signal to provide a frequency select signal; and
   h. analog switches for selecting, based on said frequency select signal, one of said first and second oscillator signals and one of said first and second filtered signals to be input into said demodulator.

2. The alarm system receiver of claim 1 wherein said first and second frequencies are between 260 MHz and 470 MHz.

3. The alarm system receiver of claim 1 wherein said interference detection circuit determines if an interference signal is greater than a predetermined threshold for a predetermined time.

4. The alarm system receiver of claim 3 wherein said predetermined threshold is [41.66 (μV/m)/MHz]*F-7083.33 μV/m, where F is a predetermined frequency.

5. The alarm system receiver of claim 3 wherein said predetermined time is two seconds.

6. A method of operating an alarm system receiver comprising:
   a. sensing signals with an antenna,
   b. filtering said sensed signals at a first frequency to provide a first filtered signal and at a second frequency to provide a second filtered signal;
   c. providing first oscillator signals at said first frequency with a first local oscillator and second oscillator signals at said second frequency with a second local oscillator;
   d. inputting into a demodulator one of said first or second oscillator signals and a corresponding one of said first or second filtered signals to provide a demodulated signal;
   e. providing an interference detection signal with an interference detection circuit if an interference signal is present in said demodulated signal;
   f. generating with a slicer circuit a quantized demodulated signal from said demodulated signal,
   g. processing said quantized demodulated signal as an alarm signal;
   h. processing said interference detection signal to provide a frequency select signal; and
   i. based on said frequency select signal, selecting with analog switches one of said first and second oscillator signals and one of said first and second filtered signals to be input into said demodulator.

7. The method of claim 6 wherein said first and second frequencies are between 260 MHz and 470 MHz.

8. The method of claim 6 wherein said interference detection circuit determines if an interference signal is greater than a predetermined threshold for a predetermined time.

9. The method of claim 8 wherein said predetermined threshold is [41.66 (μV/m)/MHz]*F-7083.33 μV/m, where F is a predetermined frequency.

10. The method of claim 8 wherein said predetermined time is two seconds.

* * * * *

UNITED STATES PATENT AND TRADEMARK OFFICE
CERTIFICATE OF CORRECTION

PATENT NO.      : 7,642,910 B2                                                   Page 1 of 1
APPLICATION NO. : 11/478156
DATED           : January 5, 2010
INVENTOR(S)     : Kenneth G Eskildsen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this

Sixteenth Day of November, 2010

David J. Kappos
*Director of the United States Patent and Trademark Office*